(12) United States Patent
Suzuki et al.

(10) Patent No.: US 12,541,052 B2
(45) Date of Patent: Feb. 3, 2026

(54) SEMICONDUCTOR OPTICAL INTEGRATED ELEMENT

(71) Applicant: Mitsubishi Electric Corporation, Tokyo (JP)

(72) Inventors: Yosuke Suzuki, Tokyo (JP); Koichi Akiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 662 days.

(21) Appl. No.: 18/011,848

(22) PCT Filed: Jul. 3, 2020

(86) PCT No.: PCT/JP2020/026145
§ 371 (c)(1),
(2) Date: Dec. 21, 2022

(87) PCT Pub. No.: WO2022/003937
PCT Pub. Date: Jan. 6, 2022

(65) Prior Publication Data
US 2023/0251417 A1    Aug. 10, 2023

(51) Int. Cl.
*G02B 6/12* (2006.01)
*G02F 1/017* (2006.01)
*G02F 1/225* (2006.01)

(52) U.S. Cl.
CPC .............. *G02B 6/12* (2013.01); *G02F 1/017* (2013.01); *G02F 1/225* (2013.01); *G02F 2203/70* (2013.01)

(58) Field of Classification Search
CPC ....................................................... G02B 6/12
See application file for complete search history.

(56) References Cited

U.S. PATENT DOCUMENTS 6,301,037 B1 * 10/2001 Fischer .............. H04B 10/2914
                                                           398/101
6,616,353 B1 *  9/2003 Helkey .................... G02F 1/225
                                                           398/186
(Continued)

FOREIGN PATENT DOCUMENTS

JP        2005-45247 A     2/2005
JP        2009-53366 A     3/2009
(Continued)

OTHER PUBLICATIONS

International Search Report and Written Opinion mailed on Aug. 4, 2020, received for PCT Application PCT/JP2020/026145, filed on Jul. 3, 2020, 9 pages including English Translation.
(Continued)

Primary Examiner — Deandra M Hughes
(74) Attorney, Agent, or Firm — XSENSUS LLP

(57) ABSTRACT

A semiconductor optical integrated element according to the present disclosure includes: a first optical amplifier which amplifies a signal beam inputted from a first end surface; a first passive optical waveguide which guides the amplified signal beam toward a direction different from a direction of the optical waveguide; an optical splitter which splits the guided signal beam into a plurality of signal beams; a phase modulator which is connected to the first passive optical waveguide and performs phase modulation on the plurality of signal beams; a second passive optical waveguide which guides each phase-modulated signal beam toward the direction of the optical waveguide; an optical multiplexer which multiplexes the plurality of phase-modulated signal beams into one signal beam; and a second optical amplifier which amplifies the signal beam guided by the second passive optical waveguide, and whose saturated beam output is smaller than that of the first optical amplifier.

7 Claims, 8 Drawing Sheets

(56) References Cited

U.S. PATENT DOCUMENTS

| | | | | |
|---|---|---|---|---|
| 6,956,985 | B2* | 10/2005 | Fouquet | G02F 1/3138 |
| | | | | 385/16 |
| 7,130,112 | B2* | 10/2006 | Morito | H01S 5/50 |
| | | | | 359/344 |
| 7,177,337 | B2* | 2/2007 | Takagi | H01S 5/026 |
| | | | | 359/344 |
| 7,221,500 | B2* | 5/2007 | Shibata | H01S 5/50 |
| | | | | 359/349 |
| 7,228,023 | B1* | 6/2007 | Jones | G02F 1/2255 |
| | | | | 385/2 |
| 7,715,732 | B2* | 5/2010 | Koh | G02F 1/0123 |
| | | | | 398/198 |
| 8,582,981 | B2* | 11/2013 | Akiyama | H04B 10/5053 |
| | | | | 398/195 |
| 11,588,302 | B2* | 2/2023 | Gubbins | H01S 5/1032 |
| 2002/0076133 | A1* | 6/2002 | Li | G02F 1/2257 |
| | | | | 385/16 |
| 2004/0017604 | A1 | 1/2004 | DiJaili et al. | |
| 2004/0190126 | A1* | 9/2004 | Takagi | G02B 6/12007 |
| | | | | 359/344 |
| 2005/0012988 | A1 | 1/2005 | Kim et al. | |
| 2008/0044128 | A1* | 2/2008 | Kish, Jr. | G02B 6/12033 |
| | | | | 385/14 |
| 2009/0052834 | A1 | 2/2009 | Tanaka et al. | |
| 2009/0147352 | A1* | 6/2009 | Marsh | B82Y 20/00 |
| | | | | 359/344 |
| 2010/0142567 | A1* | 6/2010 | Ward | H01S 5/141 |
| | | | | 372/20 |
| 2011/0052114 | A1* | 3/2011 | Bernasconi | H01S 5/026 |
| | | | | 438/31 |
| 2013/0208350 | A1* | 8/2013 | Saito | H01S 3/067 |
| | | | | 359/341.1 |
| 2014/0078580 | A1* | 3/2014 | Hasegawa | H01S 5/5018 |
| | | | | 359/344 |
| 2014/0133511 | A1* | 5/2014 | Tanaka | H01S 5/1032 |
| | | | | 372/50.22 |
| 2014/0362433 | A1* | 12/2014 | Adams | H01S 5/0265 |
| | | | | 359/344 |
| 2017/0146886 | A1 | 5/2017 | Saito et al. | |
| 2017/0244491 | A1* | 8/2017 | Hayashi | H04B 10/54 |
| 2019/0302360 | A1 | 10/2019 | Salto et al. | |
| 2019/0317341 | A1* | 10/2019 | Nishikawa | G02F 1/017 |
| 2020/0150240 | A1* | 5/2020 | Huwer | G01S 7/4865 |
| 2021/0391694 | A1* | 12/2021 | Hayashi | H01S 5/50 |
| 2022/0091472 | A1* | 3/2022 | Muranaka | G02F 1/225 |
| 2023/0095427 | A1* | 3/2023 | Muranaka | G02F 1/015 |
| | | | | 385/9 |

FOREIGN PATENT DOCUMENTS

| | | |
|---|---|---|
| JP | 2012-4441 A | 1/2012 |
| JP | 5144306 B2 | 2/2013 |
| JP | 5497678 B2 | 5/2014 |
| JP | 2015-122352 A | 7/2015 |
| JP | 2017-173346 A | 9/2017 |
| WO | 2018/117077 A1 | 6/2018 |
| WO | 2018/131227 A1 | 7/2018 |
| WO | 2019/111675 A1 | 6/2019 |

OTHER PUBLICATIONS

Hasegawa et al., "Semiconductor Optical Amplifier with Low Noise Figure", Furukawa Electric Co., Ltd., Furukawa Electric Times, No. 127, Feb. 2011, pp. 7-10 (9 pages including English Translation).

Kikuchi et al., "High-speed InP-based Mach-Zehnder Modulator for Advanced Modulation Formats", Compound Semiconductor Integrated Circuit Symposium, Oct. 2012, 4 pages.

Notice of Reasons for Refusal mailed on Nov. 10, 2020, received for JP Application 2020-555260, 12 pages including English Translation.

Notice of Reasons for Refusal mailed on Feb. 24, 2021, received for JP Application 2020-555260, 17 pages including English Translation.

* cited by examiner

SEMICONDUCTOR OPTICAL INTEGRATED ELEMENT

CROSS-REFERENCE TO RELATED APPLICATION

The present application is based on PCT filing PCT/JP2020/026145, filed Jul. 3, 2020, the entire contents of which are incorporated herein by reference.

TECHNICAL FIELD

The present disclosure relates to a semiconductor optical integrated element.

BACKGROUND ART

Communication traffic has been rapidly increasing as mobile communication terminals such as a smartphone spread and a variety of data services using cloud appear. Along with this, speed increase and capacity increase are required also in an optical communication network over a comparatively short distance such as between cities or data centers, as well as a trunk line optical communication network connecting large cities.

In order to transmit a large amount of communication data, it is effective to use an optical transceiver of a coherent phase modulation type capable of multilevel modulation, and a phase modulation element of a Mach-Zehnder type which can generate an optical modulated signal at a high speed has been attracting attention.

For such an optical transceiver, size reduction and power consumption reduction are also required. Therefore, it is effective to use a phase modulation element formed from a semiconductor material, instead of a phase modulation element using a dielectric material such as lithium niobate (LiNbO$_3$). Further, if a laser element, an optical amplification element for amplifying a signal beam, and the like are integrated on the same semiconductor substrate, the size can be more reduced, and therefore expectation for a semiconductor optical integrated element is being raised.

CITATION LIST

Patent Document

Patent Document 1: Japanese Patent No. 5497678
Patent Document 2: Japanese Patent No. 5144306
Patent Document 3: WO2018/117077

Non-Patent Document

Non-Patent Document 1: N. Kikuchi et al., "High-speed InP-based Mach-Zehnder Modulator for Advanced Modulation Formats", Compound Semiconductor Integrated Circuit Symposium, October 2012.

SUMMARY OF THE INVENTION

Problems to be Solved by the Invention

In order to obtain a semiconductor optical integrated element with a reduced size and reduced power consumption, it is desirable to integrate a phase modulation element and an optical amplification element on an indium phosphide (InP) substrate. In this case, if an optical waveguide of the phase modulation element is formed along a [0-11] plane direction axis which is a crystal plane orientation, high modulation efficiency is obtained, and therefore the semiconductor optical integrated element can be downsized.

Further, on a path through which a beam propagates from an optical input portion to an optical output portion, if the optical amplification elements are provided at a stage preceding the phase modulation element and a stage subsequent to the phase modulation element, a high optical gain is obtained and thus power consumption of the optical integrated element can be reduced. However, there is a problem that a modulated signal is distorted and a desired optical modulated signal cannot be obtained.

The present disclosure has been made to solve the above problem, and an object of the present disclosure is to provide a semiconductor optical integrated element capable of obtaining a modulated optical signal less distorted while having high phase modulation efficiency.

Solution to the Problems

A semiconductor optical integrated element according to the present disclosure amplifies a signal beam inputted to a semiconductor substrate, and includes: an optical input portion which is located in contact with a first end surface of the semiconductor substrate and to which the signal beam is inputted; a first optical amplifier which is provided on the semiconductor substrate so as to contact with the optical input portion, and which amplifies the signal beam inputted from the contacted optical input portion, along an optical waveguide; a passive optical waveguide portion which is provided on the semiconductor substrate and propagates the signal beam amplified by the first optical amplifier toward a beam propagation direction different from a direction of the optical waveguide; a phase modulator which is provided on the semiconductor substrate and performs phase modulation on the signal beam propagated by the passive optical waveguide portion; a second optical amplifier which is provided on the semiconductor substrate and amplifies, along a direction of the optical waveguide different from the beam propagation direction, the signal beam propagated toward the beam propagation direction by the passive optical waveguide portion and phase-modulated by the phase modulator; and an optical output portion which is located in contact with the first end surface of the semiconductor substrate and contacts with the second optical amplifier, and which outputs the signal beam amplified by the contacted second optical amplifier along the direction of the optical waveguide different from the beam propagation direction, wherein an optical waveguide length of the second optical amplifier contacting with the optical output portion is smaller than an optical waveguide length of the first optical amplifier.

Effect of the Invention

In the semiconductor optical integrated element according to the present disclosure, the directions of the optical waveguides of the first optical amplifier and the second optical amplifier are arranged to be different from the direction of the optical waveguide of the phase modulator, and the saturated beam output of the second optical amplifier located on the beam output side is set to be smaller than that of the first optical amplifier located on the beam input side, thus providing an effect of obtaining a modulated optical signal less distorted while having high phase modulation efficiency.

DESCRIPTION OF EMBODIMENTS

Embodiment 1

Figure 1:
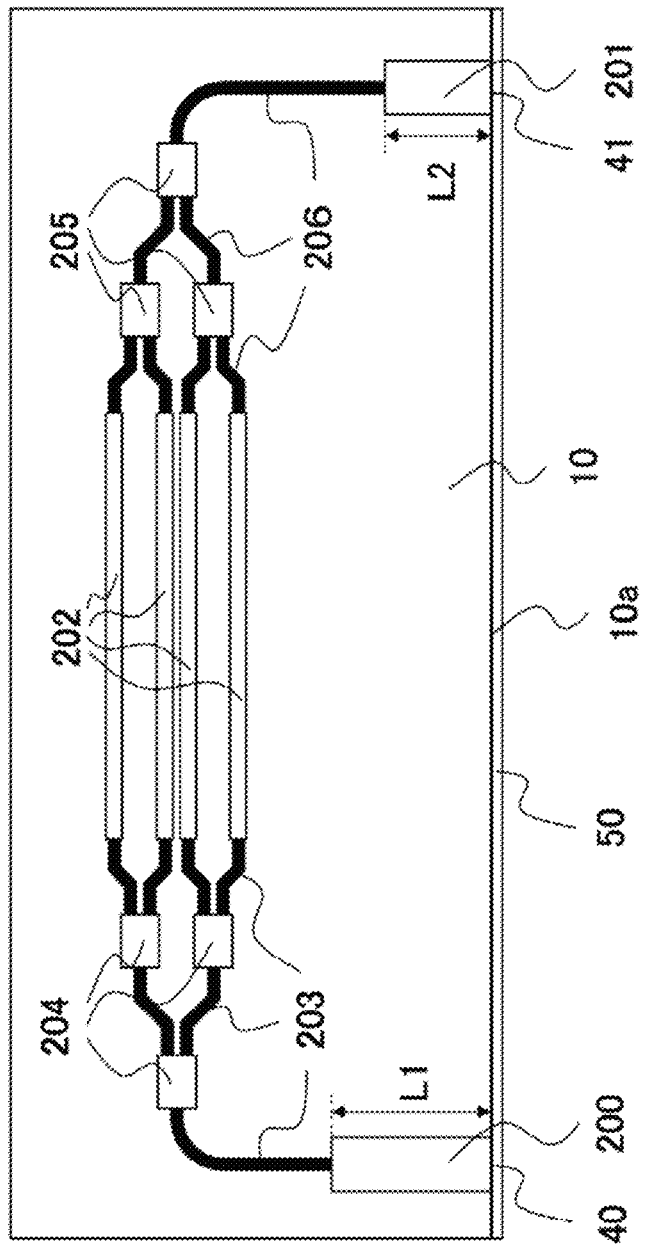
FIG. 1 is a top view showing a semiconductor optical integrated element according to embodiment 1.

FIG. 1 shows a top view of a semiconductor optical integrated element 100 according to embodiment 1.

The semiconductor optical integrated element 100 according to embodiment 1 is formed such that, on the surface of a semiconductor substrate 10 formed from a group IV semiconductor, a group III-V compound semiconductor, a group II-VI compound semiconductor, or a semiconductor made of a mixed crystal thereof, a first optical amplifier 200 and a second optical amplifier 201 having a function of amplifying a beam intensity, a phase modulator 202 having a function of changing a beam phase, a first passive optical waveguide 203 connecting the first optical amplifier 200 and the phase modulator 202 and having a function of propagating a beam, and a second passive optical waveguide 206 connecting the phase modulator 202 and the second optical amplifier 201 and having a function of propagating a beam, are formed in an integrated manner.

An optical input portion 40 of the semiconductor optical integrated element 100 is located at a first end surface 10a formed as a flat surface by means such as cleavage or etching, and the first optical amplifier 200 is located with its one end contacting with the optical input portion 40. In other words, one end of the first optical amplifier 200 facing the first end surface 10a serves as the optical input portion 40. The above first end surface 10a is a side surface portion of the semiconductor optical integrated element 100.

Since one end of the first optical amplifier 200 contacts with the first end surface 10a, it becomes unnecessary to provide a passive optical waveguide for guiding a signal beam from the first end surface 10a to the first optical amplifier 200, thus providing an effect of increasing the output of an amplified signal beam even with low power consumption.

Similarly, the second optical amplifier 201 is located so as to contact with an optical output portion 41 located at the first end surface 10a. In other words, one end of the second optical amplifier 201 facing the first end surface 10a serves as the optical output portion 41.

The length of an optical amplification region in the second optical amplifier 201, i.e., an optical waveguide length L2 of the second optical amplifier 201 is smaller than the length of an optical amplification region in the first optical amplifier 200, i.e., an optical waveguide length L1 of the first optical amplifier 200. That is, a relationship of L1>L2 is satisfied.

Technical significance of making the optical waveguide length L2 of the second optical amplifier 201 smaller than the optical waveguide length L1 of the first optical amplifier 200 will be described later.

As with the location of the first optical amplifier 200, since one end of the second optical amplifier 201 contacts with the first end surface 10a, it becomes unnecessary to provide a passive optical waveguide for guiding a signal beam from the second optical amplifier 201 to the first end surface 10a, thus providing an effect of increasing the output of an amplified signal beam even with low power consumption.

The beam propagation direction of the first optical amplifier 200 and the beam propagation direction of the second optical amplifier 201 are directions along a [011] plane direction axis which is a crystal plane orientation of the semiconductor. On the other hand, the beam propagation direction of the phase modulator 202 is a direction along a [0-11] plane direction axis which is a crystal plane orientation of the semiconductor.

That is, the beam propagation directions of the first optical amplifier 200 and the second optical amplifier 201, and the beam propagation direction of the phase modulator 202, are in such a relationship that the directions are different from each other by 90°.

On the first end surface 10a at which the optical input portion 40 and the optical output portion 41 are provided, an anti-reflective coating film 50 is formed so as to cover the optical input portion 40 and the optical output portion 41. Owing to the anti-reflective coating film 50, a reflected beam amplified in the first optical amplifier 200 or the second optical amplifier 201 can be prevented from interfering with a signal beam, whereby distortion of an optical modulated signal can be suppressed.

Figure 3:
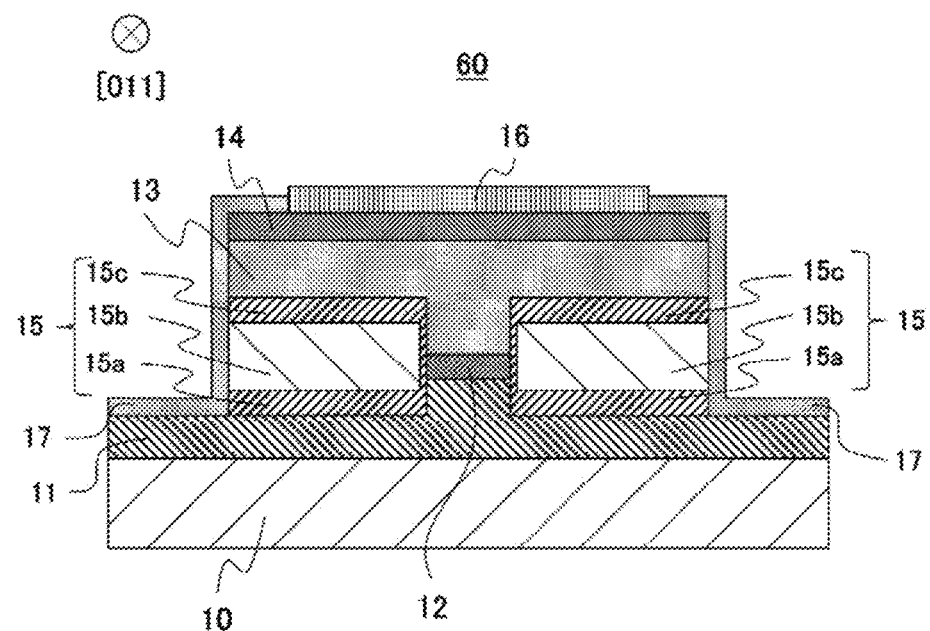
FIG. 3 is a sectional view showing an optical amplifier in the semiconductor optical integrated element according to embodiment 1.

First, the structures of the first optical amplifier 200 and the second optical amplifier 201 will be described with reference to FIG. 3 showing a sectional view along a plane perpendicular to the beam propagation direction.

A gain core layer 12 is a semiconductor layer having a function of amplifying an inputted beam by application of current. In the semiconductor substrate 10, a lower cladding layer 11 and an upper cladding layer 13 respectively provided on the upper and lower sides of the gain core layer 12 are formed by semiconductor layers having lower refractive indices than the gain core layer 12 in order to confine a beam in the gain core layer 12.

A contact layer 14 is formed by a semiconductor layer having a lower resistance than the upper cladding layer 13 in order to reduce the electric resistance when current is applied from an optical amplifier electrode 16 to the semiconductor layers below.

A current block layer 15 is formed by a structure or a material that does not allow current to flow, and is a semiconductor layer for concentrating current in the gain core layer 12. In FIG. 3, as an example of the current block layer 15, a three-layer structure composed of a first current block layer 15a, a second current block layer 15b, and a third current block layer 15c is shown. However, the structure of the current block layer 15 is not limited to the three-layer structure, and may be any semiconductor layer that has a function of blocking current.

A protective insulation film 17 is formed by an insulating material such as an inorganic insulation film, e.g., an oxide film or a nitride film, or an organic insulation film, e.g., benzocyclobutene (BCB), and is an insulation film for preventing the semiconductor layers from being oxidized or transformed due to oxygen or water in the atmosphere.

The first optical amplifier 200 and the second optical amplifier 201 forming parts of the semiconductor optical integrated element 100 according to embodiment 1 is formed by a buried structure 60 in which the current block layers 15 are formed at side walls of the gain core layer 12. The buried structure 60 serves as an optical waveguide.

In the buried structure 60, heat generated in the gain core layer 12 is diffused via the current block layers 15 and gain reduction due to temperature increase in the gain core layer 12 can be suppressed, thus providing an effect of increasing the output of the semiconductor optical integrated element 100.

Next, the details of a method for manufacturing the first optical amplifier 200 and the second optical amplifier 201 will be described.

For example, on the semiconductor substrate 10 formed from an InP substrate whose substrate surface corresponds to a (100) plane of a semiconductor crystal plane orientation, an n-type InP layer with a layer thickness of 2000 nm to become the lower cladding layer 11, a multiple quantum well structure 400 formed from AlGaInAs with a total layer thickness of 100 nm to serve as the gain core layer 12 of the first optical amplifier 200 and the second optical amplifier 201, and a p-type InP layer with a layer thickness of 500 nm to become a part of the upper cladding layer 13, are epitaxially grown using metal organic chemical vapor deposition (MOCVD).

Here, the multiple quantum well structure 400 is formed by repetition of a pair of a well layer 421 which contributes to amplification of a beam and a barrier layer 422 having a larger bandgap than the well layer 421. In the first optical amplifier 200 and the second optical amplifier 201, the number of pairs of the well layers 421 and the barrier layers 422 in the multiple quantum well structure 400 is, for example, eight. The multiple quantum well structure 400 will be described later in detail.

The lower cladding layer 11 epitaxially grown in this process can be used also as the lower cladding layer 11 of the phase modulator 202, the first passive optical waveguide 203, and the second passive optical waveguide 206 described later.

Next, using photolithography and etching such as reactive ion etching (RIE), the p-type InP layer which is a part of the upper cladding layer 13, the gain core layer 12, and a part of the n-type InP layer which is the lower cladding layer 11 are etched while regions for forming the first optical amplifier 200 and the second optical amplifier 201 are left, thus forming a ridge structure.

The ridge structure is formed such that the beam propagation direction is along the [011] plane direction axis which is a crystal plane orientation of the semiconductor. In addition, in the ridge structure of the first optical amplifier 200, for example, the optical waveguide length L1 along the [011] direction axis is set to 500 μm and the optical waveguide width is set to 2 μm, and in the ridge structure of the second optical amplifier 201, for example, the optical waveguide length L2 along the [011] plane direction axis which is a crystal plane orientation of the semiconductor is set to 300 μm and the optical waveguide width is set to 2 μm, whereby the optical waveguide length L2 of the second optical amplifier 201 can be made smaller than the optical waveguide length L1 of the first optical amplifier 200.

The saturated beam outputs of the first optical amplifier 200 and the second optical amplifier 201 are proportional to inputted power. Therefore, by setting the optical waveguide length L2 of the second optical amplifier 201 to be smaller than the optical waveguide length L1 of the first optical amplifier 200 as described above, the structure in which the saturated beam output of the second optical amplifier 201 is smaller than that of the first optical amplifier 200 can be achieved.

Thus, although a signal beam imparted with a gain by the optical amplifier that performs optical amplification operation under a great saturated beam output is distorted in phase, in the semiconductor optical integrated element 100 according to embodiment 1, a modulated optical signal less distorted can be obtained from the optical output portion 41 owing to application of the above structure in which the optical waveguide length L2 of the second optical amplifier 201 is made smaller than the optical waveguide length L1 of the first optical amplifier 200.

Subsequently, in order to make the buried structure 60 in which the current block layers 15 are formed at side walls of the gain core layer 12, the current block layers 15 having a layer thickness corresponding to the height of the ridge structure are formed through epitaxial growth.

Here, if the current block layers 15 are formed in a state in which the ridge structure is along the [0-11] plane direction axis which is a crystal plane orientation of the semiconductor, the crystal growth speed in epitaxial growth on a (111) plane exposed at the ridge portion is fast and therefore it is difficult to form flat current block layers 15 at side walls of the ridge portion. As a result, current cannot be sufficiently concentrated in the gain core layer 12 and thus such a malfunction that a desired beam output cannot be obtained can occur.

In contrast, in the semiconductor optical integrated element 100 according to the present disclosure, the ridge structure of the first optical amplifier 200 and the second optical amplifier 201 and therefore the optical waveguide formed by the buried structure 60 are formed along the [011] plane direction axis which is a crystal plane orientation of the semiconductor. Therefore, the (111) plane is not exposed at the ridge portion, and thus the flat current block layer 15 which exhibits a high current concentrating effect can be formed, whereby a high beam output can be obtained with low power consumption.

For the current block layer 15, a layered structure in which a set of a p-type semiconductor layer, an n-type semiconductor layer, and a p-type semiconductor layer is repeatedly layered, or a semi-insulating semiconductor such as an InP layer doped with Fe, can be used.

For example, in a case where the height of the ridge portion is 700 nm, a three-layer structure composed of a first current block layer 15a formed from a p-type InP layer with a layer thickness of 100 nm, a second current block layer 15b formed from an n-type InP layer with a layer thickness of 500 nm, and a third current block layer 15c formed from a p-type InP layer with a layer thickness of 500 nm is epitaxially grown from the semiconductor substrate 10 side, whereby the current block layer 15 can be formed.

Subsequently, a p-type InP layer with a layer thickness of 1500 nm to become the upper cladding layer 13 and a p-type InGaAs layer with a layer thickness of 300 nm to become the contact layer 14 are formed through epitaxial growth.

Further, on the contact layer 14, the optical amplifier electrode 16 formed by metal such as Ti, Au, Pt, Nb, or Ni is formed.

In addition, in order to prevent transformation of the semiconductor layers due to oxidization or the like, the protective insulation film 17 formed from silicon dioxide ($SiO_2$) with a film thickness of 300 nm is formed using chemical vapor deposition (CVD) or the like, thereby completing the first optical amplifier 200 and the second optical amplifier 201 having the buried structure 60 in which the current block layers 15 are formed at both side walls of the gain core layer 12 as shown in FIG. 3.

Figure 4:
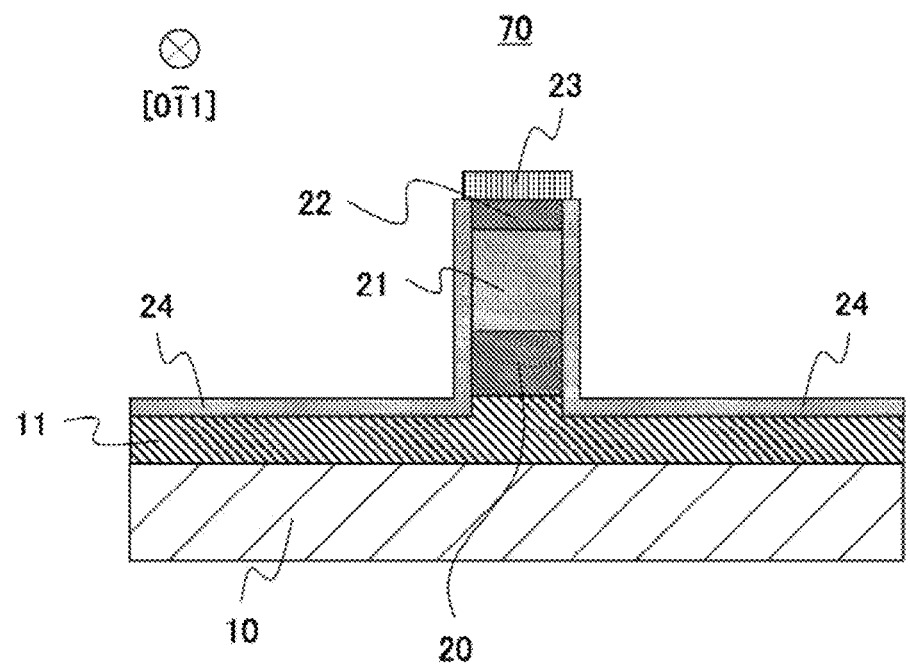
FIG. 4 is a sectional view showing a phase modulator in the semiconductor optical integrated element according to embodiment 1.
Figure 5:
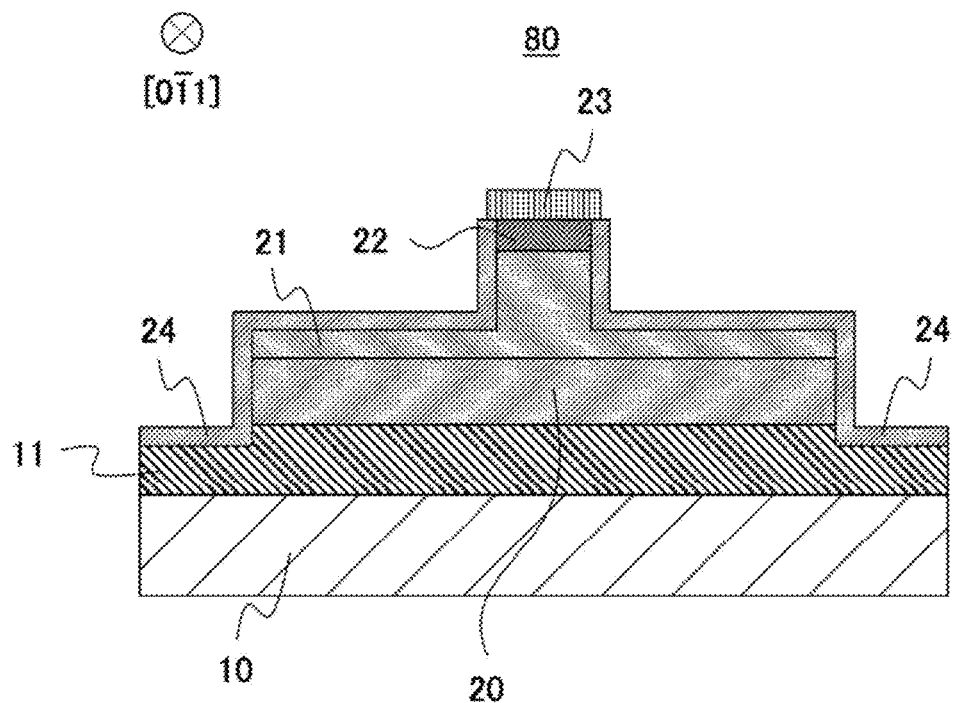
FIG. 5 is a sectional view showing a phase modulator in the semiconductor optical integrated element according to embodiment 1.

Next, the phase modulator 202 will be described with reference to FIG. 4 and FIG. 5 showing sectional views along a plane perpendicular to the beam propagation direction.

In the phase modulator 202, with respect to a signal beam amplified by the first optical amplifier 200 and guided toward a direction different from the direction of the optical waveguide of the phase modulator 202 by the first passive optical waveguide 203, voltage is applied to a modulation core layer 20 so as to change a refractive index, thereby changing the phase of the signal beam, thus performing phase modulation.

The modulation core layer 20 is a semiconductor layer having a function of changing the phase of a propagating beam by its refractive index being changed when voltage is applied. The modulation core layer 20 is formed on the lower cladding layer 11 described above. An upper cladding layer 21 is formed by a semiconductor layer having a lower refractive index than the modulation core layer 20 in order to confine the beam in the modulation core layer 20.

A contact layer 22 is formed by a semiconductor layer having a lower resistance than the upper cladding layer 21 in order to reduce the electric resistance when voltage is applied from a phase modulator electrode 23 to the semiconductor layers.

A protective insulation film 24 is formed by an insulating material such as an inorganic insulation film, e.g., an oxide film or a nitride film, or an organic insulation film, e.g., benzocyclobutene (BCB), and is an insulation film for preventing the semiconductor layers from being oxidized or transformed due to oxygen or water in the atmosphere.

For the phase modulator 202 forming a part of the semiconductor optical integrated element 100 according to embodiment 1, it is preferable to apply a high-mesa structure 70 obtained by etching a range from the contact layer 22 to a part of the lower cladding layer 11 excluding the beam propagation region as shown in FIG. 4 by RIE or the like, or a ridge structure 80 obtained by etching a range from the contact layer 22 to a part of the upper cladding layer 21 as shown in FIG. 5.

In the high-mesa structure 70 shown in FIG. 4, since the refractive index difference between the modulation core layer 20 and the etched region is great, a beam can be intensely confined in the modulation core layer 20. Thus, when the refractive index of the modulation core layer 20 is changed, the beam phase change amount increases, whereby high phase modulation efficiency is obtained.

On the other hand, in the ridge structure 80 shown in FIG. 5, side walls of the modulation core layer 20 and the like are not exposed, and therefore damage on the crystal surface by etching or transformation due to oxidization can be suppressed, thus providing an effect of reducing characteristics variation of the phase modulator 202 and improving long-term reliability thereof.

Hereinafter, the details of a method for manufacturing the phase modulator 202 will be described.

On the lower cladding layer 11 epitaxially grown when the first optical amplifier 200 and the second optical amplifier 201 are formed, a multiple quantum well structure 400 formed from aluminium gallium indium arsenide (AlGaInAs) with a total layer thickness of 300 nm to become the modulation core layer 20, a p-type InP layer with a layer thickness of 1800 nm to become the upper cladding layer 21, and a p-type indium gallium arsenide (InGaAs) layer with a layer thickness of 300 nm to become the contact layer 22 are epitaxially grown.

Subsequently, the semiconductor layers are selectively etched by etching means such as RIE so as to form the high-mesa structure 70 shown in FIG. 4 or the ridge structure 80 shown in FIG. 5, and then, on the contact layer 22, the phase modulator electrode 23 formed by metal such as Ti, Au, Pt, Nb, or Ni and a $SiO_2$ film with a film thickness of 300 nm to become the protective insulation film 24 for protecting the surface of the semiconductor layers, are formed by CVD or the like.

In the above manufacturing process, for the phase modulator 202 having the optical waveguide formed by the high-mesa structure 70 or the ridge structure 80, the optical waveguide is formed such that the beam propagation direction is along the [0-11] plane direction axis which is a crystal plane orientation of the semiconductor. When voltage is applied to the modulation core layer 20 of the phase modulator 202, the refractive index of the modulation core layer 20 is changed by electrooptic effects such as Pockels effect, Kerr effect, and quantum-confined Stark effect. In the case where the beam propagation direction of the phase modulator 202, i.e., the optical waveguide direction is formed along the [0-11] plane direction axis which is a crystal plane orientation of the semiconductor, the directions of refractive index changes by the Pockels effect and the quantum-confined Stark effect are the same and overlap each other, whereby high phase modulation efficiency can be obtained.

Figure 6:
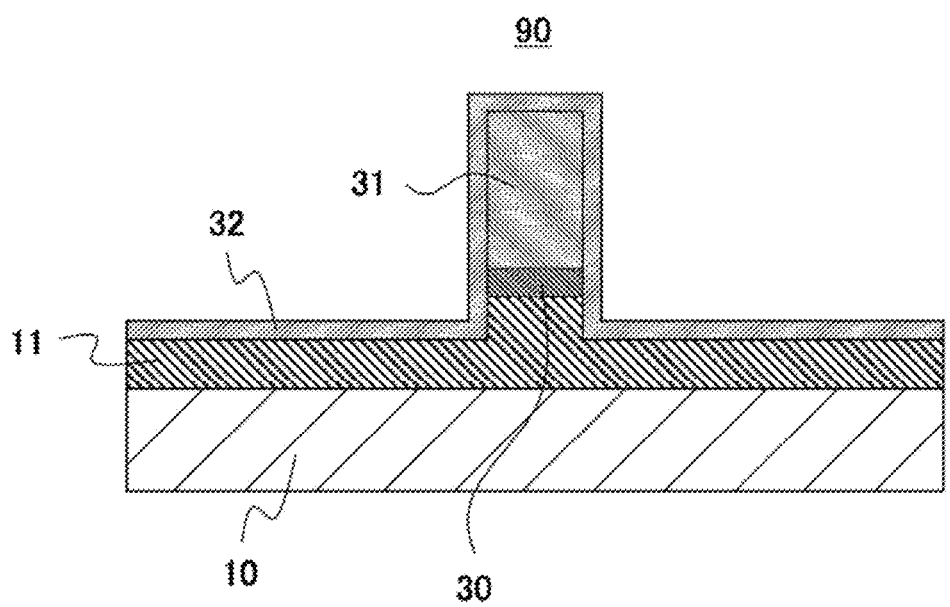
FIG. 6 is a sectional view showing a passive optical waveguide in the semiconductor optical integrated element according to embodiment 1.

Next, the first passive optical waveguide 203 will be described with reference to FIG. 6 showing a sectional view along a plane perpendicular to the beam propagation direction. An optical waveguide core layer 30 is formed by a semiconductor layer whose bandgap energy is greater than photon energy by of a signal beam in order to propagate the beam without loss, and is formed on the lower cladding layer 11 described above.

For having a function of confining a beam in the optical waveguide core layer 30, an upper cladding layer 31 is formed by a semiconductor layer having a lower refractive index than the optical waveguide core layer 30. The protective insulation film 32 is formed by an insulating material such as an inorganic insulation film, e.g., an oxide film or a nitride film, or an organic insulation film, e.g., benzocyclobutene (BCB), and is an insulation film for preventing the semiconductor layers from being oxidized or transformed due to oxygen or water in the atmosphere.

The first passive optical waveguide 203 does not have a function of changing the intensity and the phase of a beam, and therefore need not have a structure for applying current or voltage, such as an electrode or a contact layer.

The first passive optical waveguide 203 forming a part of the semiconductor optical integrated element 100 according to embodiment 1 is formed by a passive optical waveguide high-mesa structure 90 obtained by etching a range from the upper cladding layer 31 to a part of the lower cladding layer 11 by RIE or the like.

Since the beam propagation direction axes of the first optical amplifier 200 and the phase modulator 202 are perpendicular to each other, the first passive optical waveguide 203 connecting these needs to have a curved region. In order to reduce optical loss in the optical waveguide curved region, it is preferable that the first passive optical waveguide 203 has the passive optical waveguide high-mesa structure 90 which can intensely confine a beam.

In addition, as shown in FIG. 1, the first passive optical waveguide 203 may partially include optical splitters 204 formed by a multi-mode interference (MMI) waveguide, a directional coupler, or the like.

In this case, inside the semiconductor optical integrated element 100, a Mach-Zehnder modulator can be applied as the phase modulator 202, thus contributing to downsizing of the optical transceiver.

Next, the details of a method for manufacturing the first passive optical waveguide 203 will be described. A method for manufacturing the second passive optical waveguide 206 described later is also the same method.

On the lower cladding layer 11 epitaxially grown when the first optical amplifier 200 and the second optical amplifier 201 are formed, an i-type indium gallium arsenide phosphide (InGaAsP) layer with a layer thickness of 100 nm to become the optical waveguide core layer 30, and an i-type InP layer having a layer thickness of 2000 nm to become the upper cladding layer 31, are epitaxially grown.

Subsequently, as shown in FIG. 6, the passive optical waveguide high-mesa structure 90 is formed by etching the semiconductor layers by RIE or the like, and then a $SiO_2$ layer with a layer thickness of 300 nm to become the protective insulation film 32 for protecting the surface of the semiconductor layers exposed by the etching is formed by CVD or the like.

In addition, as shown in FIG. 1, the first passive optical waveguide 203 may partially include the optical splitters 204 and optical multiplexers 205 using a multi-mode interference (MMI) waveguide, a directional coupler, or the like. In this case, a Mach-Zehnder modulator can be easily formed inside the semiconductor optical integrated element 100, thus contributing to downsizing of the optical transceiver.

The second passive optical waveguide 206 forming a part of the semiconductor optical integrated element 100 according to embodiment 1 has the passive optical waveguide high-mesa structure 90 obtained by etching a range from the upper cladding layer 31 to a part of the lower cladding layer 11 by RIE or the like, as in the first passive optical waveguide 203.

Since the beam propagation direction axes of the phase modulator 202 and the second optical amplifier 201 are perpendicular to each other, the second passive optical waveguide 206 connecting these needs to have a curved region. In order to reduce optical loss in the optical waveguide curved region, it is preferable that the second passive optical waveguide 206 has the passive optical waveguide high-mesa structure 90 which can intensely confine a beam, as in the first passive optical waveguide 203.

In addition, as shown in FIG. 1, in the case where the optical splitters 204 are provided at parts of the first passive optical waveguide 203, optical multiplexers 205 using a multi-mode interference waveguide, a directional coupler, or the like are provided at parts of the second passive optical waveguide 206, in order to multiplex a plurality of branched signal beams into one signal beam.

Next, from a semiconductor wafer in which a plurality of semiconductor optical integrated elements 100 are formed, each semiconductor optical integrated element 100 is cut by a chip separation method such as cleavage or etching so that one end of each of the first optical amplifier 200 and the second optical amplifier 201 is exposed at the first end surface 10a, that is, these ends of the first optical amplifier 200 and the second optical amplifier 201 both contact with the first end surface 10a, thus separating the wafer into individual chips.

Through the chip separation process, the part of the first optical amplifier 200 exposed at the first end surface 10a becomes the optical input portion 40, and the part of the second optical amplifier 201 exposed at the first end surface 10a becomes the optical output portion 41. The optical input portion 40 is one end part of the first optical amplifier 200 and the optical output portion 41 is one end part of the second optical amplifier 201.

Using vapor deposition or sputtering, the anti-reflective coating film 50 is formed on the first end surface 10a so as to cover the optical input portion 40 and the optical output portion 41. The anti-reflective coating film 50 has a layered structure of an insulation film formed from an oxide film or a nitride film of Si, Al, Ta, Nb, or the like so that the beam reflectance at the first end surface 10a becomes zero.

For example, as described in Patent Document 3, in a case where an optical amplification element is formed inside a chip without contacting with the end surface, additional optical waveguides are needed between the optical amplification element and the optical input portion and between the optical amplification element and the optical output portion. Regarding each of these optical waveguides, the core layers of the optical amplification element and the optical waveguide have different refractive indices or different film thicknesses. Therefore, both parts are optically non-continuous at their connection interface, so that a part of a signal beam is reflected at the connection interface and thus a reflected beam propagating in the opposite direction occurs. The reflected beam enters the optical amplification element again to be amplified, and interferes with the signal beam, thus causing such a malfunction that an optical modulated signal is distorted.

In contrast, in the semiconductor optical integrated element 100 according to the present disclosure, at the parts where the first optical amplifier 200 and the second optical amplifier 201 partially contact with the first end surface 10a, the reflectance can be made zero by the anti-reflective coating film 50, and therefore such a phenomenon that an amplified reflected beam interferes with a signal beam does not occur. Thus, distortion of the optical modulated signal can be suppressed.

Figure 2:
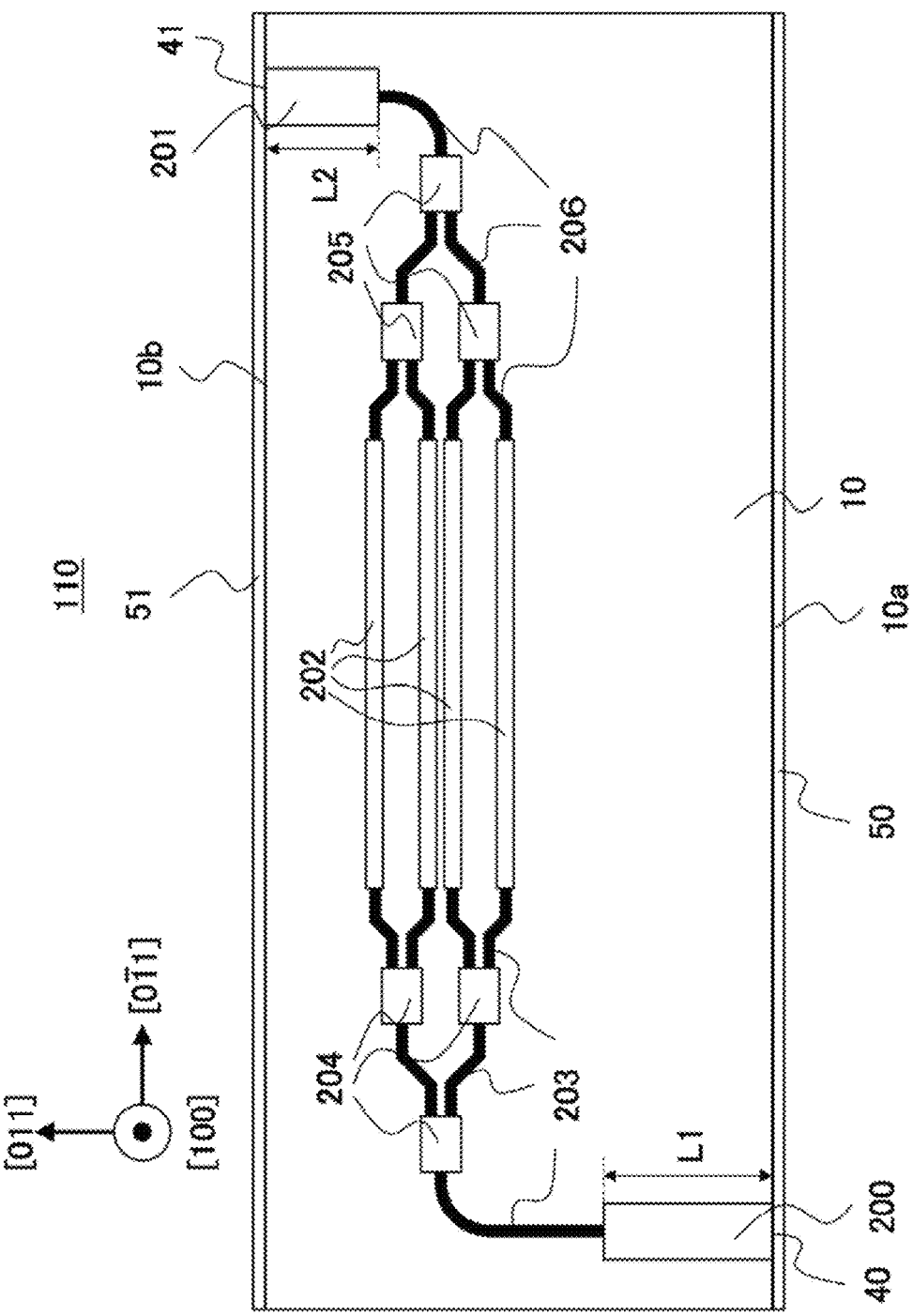
FIG. 2 is a top view showing a modification of the semiconductor optical integrated element according to embodiment 1.

In the above description, the semiconductor optical integrated element 100 shown in FIG. 1 has been described. FIG. 2 is a top view showing a semiconductor optical integrated element 110 according to a modification of the semiconductor optical integrated element 100 shown in FIG. 1.

A difference from the semiconductor optical integrated element 100 is that, in the semiconductor optical integrated element 100, the optical input portion 40 and the optical output portion 41 are provided at the same side surface portion of the semiconductor optical integrated element 100, i.e., on the first end surface 10a side, whereas in the semiconductor optical integrated element 110 according to the modification, the optical output portion 41 is provided on a second end surface 10b side opposite to the first end surface 10a where the optical input portion 40 is provided. An anti-reflective coating film 51 is formed on the opposite second end surface 10b. The structure of the anti-reflective coating film 51 is the same as that of the anti-reflective coating film 50 described above. The other structures are the same as those of the semiconductor optical integrated element 100.

Since one end of the second optical amplifier 201 contacts with the second end surface 10b, it becomes unnecessary to provide a passive optical waveguide for guiding a signal beam from the second optical amplifier 201 to the first end surface 10a, thus providing an effect of increasing the output of an amplified signal beam even with low power consumption.

In the structure of the semiconductor optical integrated element 110 according to the modification, since the optical output portion 41 is provided on the second end surface 10b side opposite to the side surface portion where the optical input portion 40 is provided, a beam output can be taken out from the opposite second end surface 10b side, thus providing an effect of improving flexibility of arrangement of the semiconductor optical integrated element as well as providing the same effects as in the semiconductor optical integrated element 100.

In the above description, minimum necessary components for performing operations as the first optical amplifier 200, the second optical amplifier 201, and the phase modulator 202 have been described, but finally, wiring electrodes, electrode pads for wire bonding, electrode protection films, and the like are formed as necessary.

The order of manufacturing process steps for the above structures may be changed. The materials of the semiconductor layers, the insulation films, the electrodes, and the like are not limited to the above ones, and any materials may be used as long as the structures of the semiconductor optical integrated elements 100, 110 of the present disclosure can be achieved.

As described above, in the semiconductor optical integrated element according to embodiment 1, the directions of the optical waveguides of the first optical amplifier 200 and the second optical amplifier 201 are arranged to be different from the direction of the optical waveguide of the phase modulator 202, and the optical waveguide length L2 of the second optical amplifier 201 is set to be smaller than the optical waveguide length L1 of the first optical amplifier 200, whereby the saturated beam output of the second optical amplifier 201 becomes smaller than that of the first optical amplifier 200, thus providing an effect of obtaining a modulated optical signal less distorted while having high phase modulation efficiency.

In addition, in the semiconductor optical integrated element according to embodiment 1, the first optical amplifier 200 is provided so as to contact with the first end surface 10a and the second optical amplifier 201 is provided so as to contact with the first end surface 10a or the second end surface 10b, thus also providing an effect of increasing the output of an amplified signal beam even with low power consumption.

Embodiment 2

Figure 7:
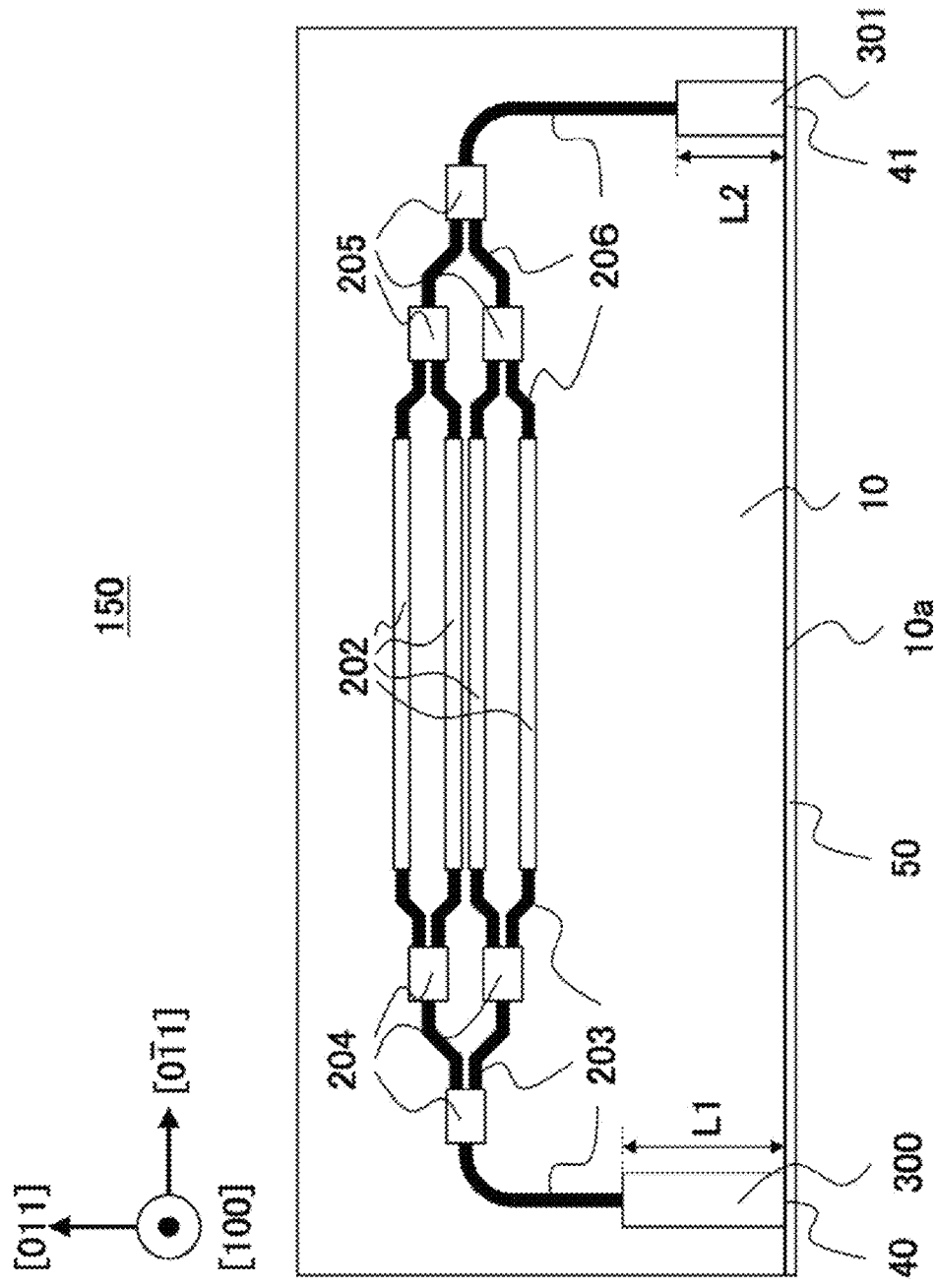
FIG. 7 is a top view showing a semiconductor optical integrated element according to embodiment 2.
Figure 8:
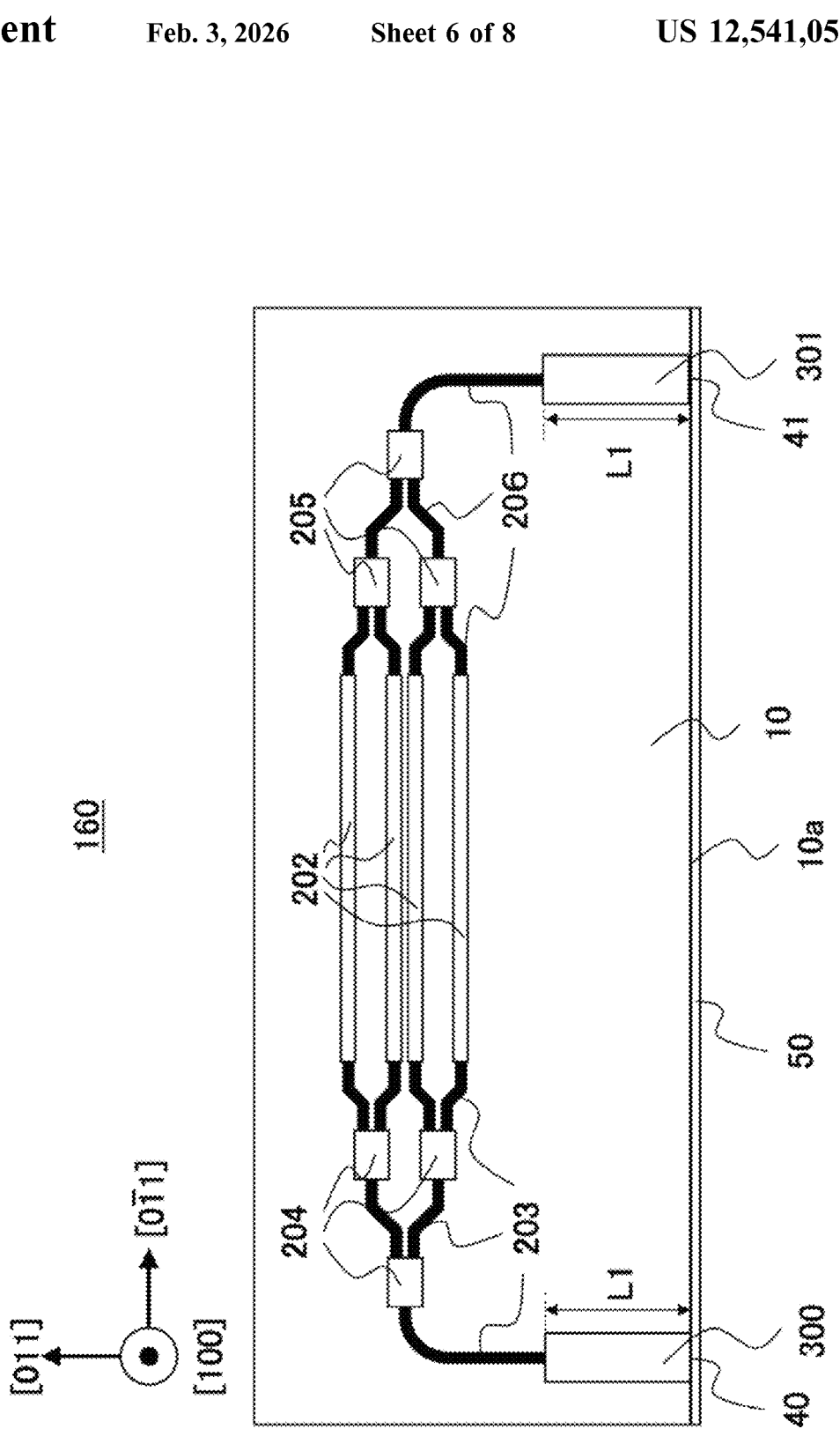
FIG. 8 is a top view showing a modification of the semiconductor optical integrated element according to embodiment 2.

FIG. 7 shows a top view of a semiconductor optical integrated element 150 according to embodiment 2, and FIG. 8 shows a top view of a semiconductor optical integrated element 160 according to a modification of the semiconductor optical integrated element 150.

A structural difference between the semiconductor optical integrated element 150 shown in FIG. 7 and the semiconductor optical integrated element 160 shown in FIG. 8 is that, in the semiconductor optical integrated element 150, the optical waveguide length L2 of a second optical amplifier 301 is smaller than the optical waveguide length L1 of a first optical amplifier 300 as in the semiconductor optical integrated element 100 according to embodiment 1, whereas in the semiconductor optical integrated element 160 according to the modification, the optical waveguide length of the second optical amplifier 301 is equal to the optical waveguide length L1 of the first optical amplifier 300, that is, both optical waveguide lengths are L1.

In the semiconductor optical integrated element 150 according to embodiment 2, regarding the total numbers of well layers 421 in a multiple quantum well structure 400 forming a first gain core layer 55 of the first optical amplifier 300 and a multiple quantum well structure 410 forming a second gain core layer 56 of the second optical amplifier 301, there is a difference from the semiconductor optical integrated element 100 according to embodiment 1, as follows: the total number of the well layers 421 in the multiple quantum well structure 410 forming the second gain core layer 56 of the second optical amplifier 301 contacting with the first end surface 10a at the optical output portion 41 is larger than the total number of the well layers 421 in the multiple quantum well structure 400 forming the first gain core layer 55 of the first optical amplifier 300 contacting with the first end surface 10a at the optical input portion 40.

As in the semiconductor optical integrated element 100 according to embodiment 1, the beam propagation directions of the first optical amplifier 300 and the second optical amplifier 301 are directions along the [011] plane direction axis which is a crystal plane orientation of the semiconductor, and the beam propagation direction of the phase modulator 202 is a direction along the [0-11] plane direction axis which is a crystal plane orientation of the semiconductor.

The structures other than the first optical amplifier 300 and the second optical amplifier 301 are the same as the element structures shown in embodiment 1, and therefore description thereof is omitted here.

Figure 9:
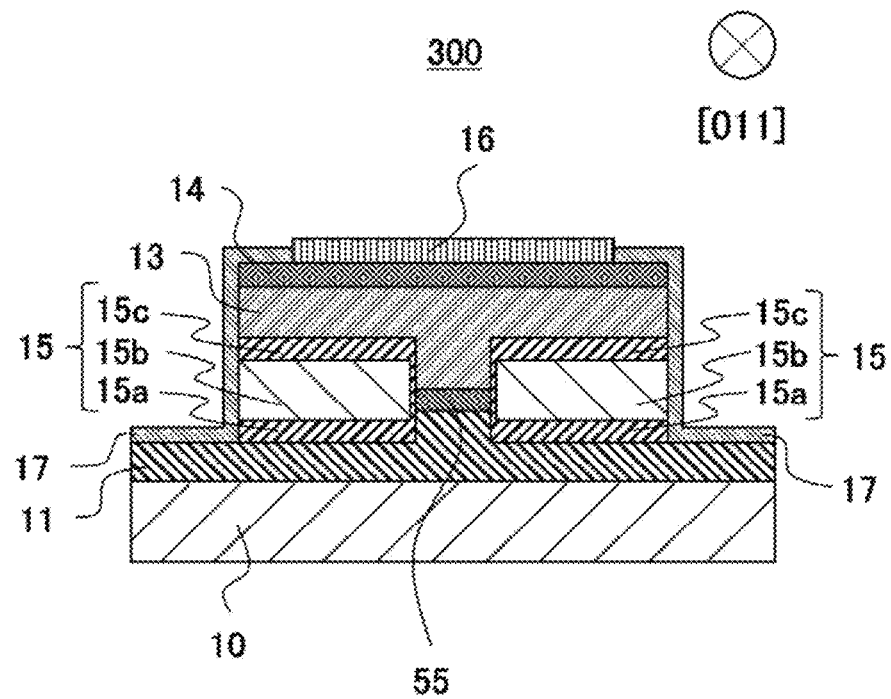
FIG. 9 is a sectional view showing an optical amplifier in the semiconductor optical integrated element according to embodiment 2.
Figure 10:
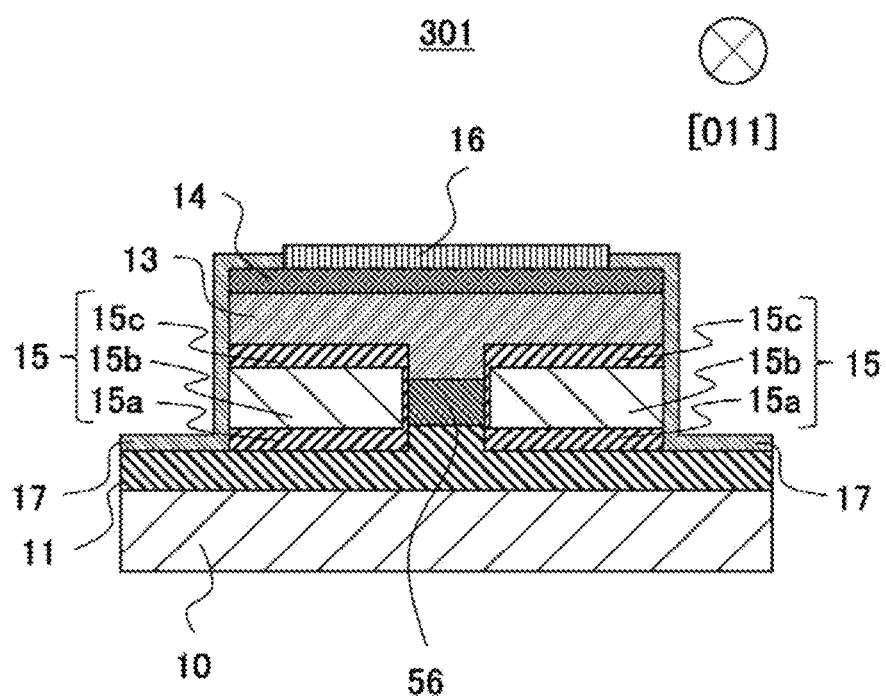
FIG. 10 is a sectional view showing an optical amplifier in the semiconductor optical integrated element according to embodiment 2.

FIG. 9 shows a sectional view along a plane perpendicular to the beam propagation direction of the first optical amplifier 300 forming a part of the structure of the semiconductor optical integrated element 150 according to embodiment 2, and FIG. 10 shows a sectional view along a plane perpendicular to the beam propagation direction of the second optical amplifier 301.

The total number of the well layers 421 in the multiple quantum well structure 400 forming the first gain core layer 55 of the first optical amplifier 300 is set to be smaller than the total number of the well layers 421 in the multiple quantum well structure 410 forming the second gain core layer 56 of the second optical amplifier 301.

Figure 11:
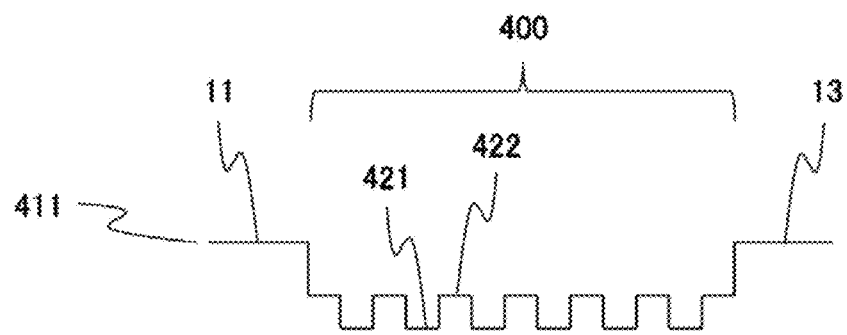
FIG. 11 is a band diagram of a multiple quantum well structure of the optical amplifier in the semiconductor optical integrated element according to embodiment 2.
Figure 12:
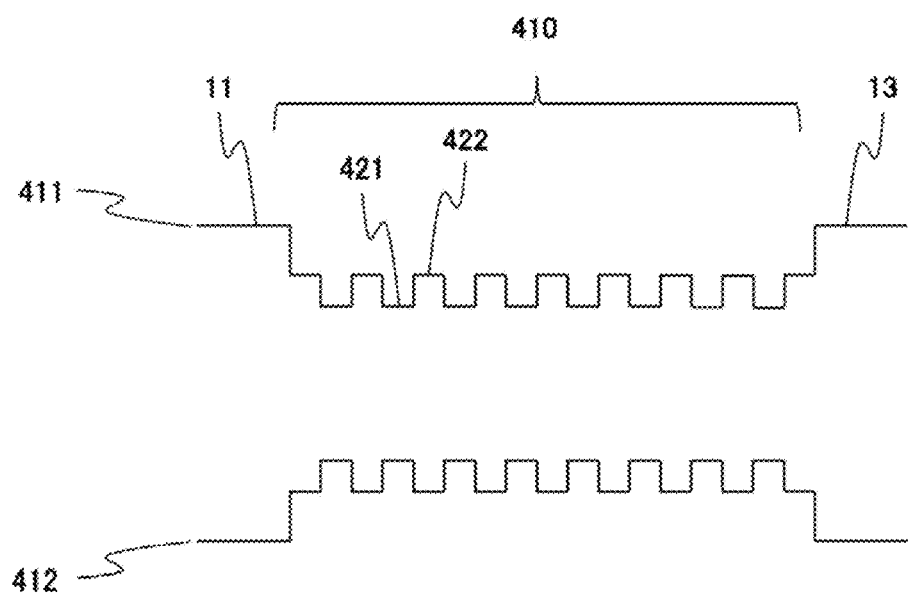
FIG. 12 is a band diagram of a multiple quantum well structure of the optical amplifier in the semiconductor optical integrated element according to embodiment 2.

FIG. 11 shows a band diagram, including neighboring regions, of the multiple quantum well structure 400 which forms the first gain core layer 55 of the first optical amplifier 300 and in which the total number of the well layers 421 is six, and FIG. 12 shows a band diagram, including neighboring regions, of the multiple quantum well structure 410 which forms the second gain core layer 56 of the second optical amplifier 301 and in which the total number of the well layers 421 is eight.

In the band diagrams in FIG. 11 and FIG. 12, an upper line represents a conduction band 411 of each semiconductor layer, and a lower line represents a valence band 412 of each semiconductor layer. The multiple quantum well structure 400 forming the first gain core layer 55 shown in the band diagram in FIG. 11 is composed of six well layers 421 and seven barrier layers 422 formed alternately. The multiple quantum well structure 400 contacts with the lower cladding layer 11 and the upper cladding layer 13.

The multiple quantum well structure 410 forming the second gain core layer 56 shown in the band diagram in FIG. 12 is composed of eight well layers 421 and nine barrier layers 422 formed alternately. The multiple quantum well structure 410 contacts with the lower cladding layer 11 and the upper cladding layer 13.

In general, the gain of the optical amplifier is increased by increasing the optical confinement factor in the gain core layer, but meanwhile, the saturated beam output is proportional to power inputted to the optical amplifier and therefore the saturated beam output becomes higher as the optical confinement factor in the gain core layer becomes lower. In addition, as the total number of the well layers in the multiple quantum well structure increases, the optical confinement factor in the gain core layer increases proportionally, so that the saturated beam output is reduced.

Accordingly, the total number of the well layers 421 in the multiple quantum well structure 410 forming the second gain core layer 56 of the second optical amplifier 301 is set to be larger than the total number of the well layers 421 in the multiple quantum well structure 400 forming the first gain core layer 55 of the first optical amplifier 300, whereby a structure in which the saturated beam output of the second optical amplifier 301 is smaller can be achieved, and thus a modulated optical signal less distorted can be obtained.

In the semiconductor optical integrated element 160 shown in FIG. 8 according to the modification of the semiconductor optical integrated element 150, the optical waveguide length of the second optical amplifier 301 is equal to the optical waveguide length L1 of the first optical amplifier 300, as described above.

Also the semiconductor optical integrated element 160 is configured such that the saturated beam output of the second optical amplifier 301 is smaller than the saturated beam output of the first optical amplifier 300. Therefore, the above-described designing of the multiple quantum well structures 400, 410 of the first gain core layer 55 and the second gain core layer 56, i.e., the designing in which the total number of the well layers 421 in the multiple quantum well structure 410 forming the second gain core layer 56 of the second optical amplifier 301 is larger than the total number of the well layers 421 in the multiple quantum well structure 400 forming the first gain core layer 55 of the first optical amplifier 300, is applied. Thus, even in the case where the optical waveguide length of the first optical amplifier 300 and the optical waveguide length of the second optical amplifier 301 are equal, the structure in which the saturated beam output of the second optical amplifier 301 is smaller can be achieved.

The semiconductor optical integrated element 160 may be configured such that, for example, the total number of the well layers 421 in the multiple quantum well structure 400 forming the first gain core layer 55 of the first optical amplifier 300 is six as in the band diagram shown in FIG. 11 and the total number of the well layers 421 in the multiple quantum well structure 410 forming the second gain core layer 56 of the second optical amplifier 301 is eight as in the band diagram shown in FIG. 12. In this way, the structure in which the saturated beam output is smaller in the second optical amplifier 301 in which the total number of the well layers 421 is larger as compared to the first optical amplifier 300, can be achieved, and thus a modulated optical signal less distorted can be obtained.

The semiconductor optical integrated element 160 provides the same effects as in the semiconductor optical integrated element 150, and also provides an effect that designing of the semiconductor optical integrated element becomes easier because the optical waveguide lengths of the first optical amplifier 300 and the second optical amplifier 301 are equal.

As described above, in the semiconductor optical integrated element 150 and the semiconductor optical integrated element 160 according to embodiment 2, the directions of the optical waveguides of the first optical amplifier 300 and the second optical amplifier 301 are arranged to be different from the direction of the optical waveguide of the phase modulator 202, and the total number of the well layers 421 in the multiple quantum well structure 410 forming the second gain core layer 56 of the second optical amplifier 301 is set to be larger than the total number of the well layers 421 in the multiple quantum well structure 400 forming the first gain core layer 55 of the first optical amplifier 300, whereby the saturated beam output of the second optical amplifier 301 can be easily made smaller than that of the first optical amplifier 300, thus providing an effect of obtaining a modulated optical signal even less distorted while having high phase modulation efficiency.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10 semiconductor substrate
10a first end surface
10b second end surface
11 lower cladding layer
12 gain core layer
13, 21, 31 upper cladding layer
14, 22 contact layer
15 current block layer
16 optical amplifier electrode
17, 24, 32 protective insulation film
20 modulation core layer
23 phase modulator electrode
30 optical waveguide core layer
40 optical input portion
41 optical output portion
50, 51 anti-reflective coating film
55 first gain core layer 56 second gain core layer
60 buried structure
70 high-mesa structure
80 ridge structure
90 passive optical waveguide high-mesa structure
100, 110, 150, 160 semiconductor optical integrated element
200, 300 first optical amplifier
201, 301 second optical amplifier
202 phase modulator
203 first passive optical waveguide
204 optical splitter
205 optical multiplexer
206 second passive optical waveguide
400, 410 multiple quantum well structure
411 conduction band
412 valence band
421 well layer
422 barrier layer

The invention claimed is:

1. A semiconductor optical integrated element which amplifies a signal beam inputted to a semiconductor substrate, the semiconductor optical integrated element comprising:
    an optical input portion which is located in contact with a first end surface of the semiconductor substrate and to which the signal beam is inputted;
    a first optical amplifier which is provided on the semiconductor substrate so as to contact with the optical input portion, and which amplifies the signal beam inputted from the contacted optical input portion, along an optical waveguide;
    a passive optical waveguide portion which is provided on the semiconductor substrate and propagates the signal beam amplified by the first optical amplifier toward a beam propagation direction different from a direction of the optical waveguide;
    a phase modulator which is provided on the semiconductor substrate and performs phase modulation on the signal beam propagated by the passive optical waveguide portion;
    a second optical amplifier which is provided on the semiconductor substrate and amplifies, along a direction of the optical waveguide different from the beam propagation direction, the signal beam propagated toward the beam propagation direction by the passive optical waveguide portion and phase-modulated by the phase modulator; and
    an optical output portion which is located in contact with the first end surface of the semiconductor substrate and contacts with the second optical amplifier, and which outputs the signal beam amplified by the contacted second optical amplifier along the direction of the optical waveguide different from the beam propagation direction, wherein
    an optical waveguide length of the second optical amplifier contacting with the optical output portion is smaller than an optical waveguide length of the first optical amplifier.

2. The semiconductor optical integrated element according to claim 1, wherein
    an optical confinement factor of the second optical amplifier is greater than an optical confinement factor of the first optical amplifier, and
    a first gain core layer of the first optical amplifier and a second gain core layer of the second optical amplifier are each formed by a multiple quantum well structure, and a total number of well layers in the multiple quantum well structure forming the second gain core layer is larger than a total number of well layers in the multiple quantum well structure forming the first gain core layer.

3. The semiconductor optical integrated element according to claim 1, wherein
    the direction of the optical waveguide of the first optical amplifier is along a plane direction axis which is a crystal plane orientation, and the different beam propagation direction is along a [0-11] plane direction axis which is a crystal plane orientation.

4. The semiconductor optical integrated element according to claim 1, wherein
    the optical waveguide of the first optical amplifier and the optical waveguide of the second optical amplifier each have a buried structure in which current block layers are formed at both sides of a gain core layer.

5. The semiconductor optical integrated element according to claim 1, wherein
    an anti-reflective coating film is provided on the first end surface.

6. A semiconductor optical integrated element having a first end surface and a second end surface opposite to the first end surface, the semiconductor optical integrated element comprising:
    a semiconductor substrate;
    a first optical amplifier which is provided on the semiconductor substrate and has one end contacting with the first end surface, and which amplifies a signal beam inputted from the first end surface, along an optical waveguide;
    a first passive optical waveguide which is provided on the semiconductor substrate and connected to another end of the first optical amplifier, and which guides the amplified signal beam toward a direction different from a direction of the optical waveguide;
    an optical splitter which is provided at the first passive optical waveguide and splits the guided signal beam into a plurality of signal beams;
    a phase modulator which is provided on the semiconductor substrate and connected to each of a plurality of the branched first passive optical waveguides, and which performs phase modulation on the plurality of signal beams along the different direction;
    a second passive optical waveguide which is provided on the semiconductor substrate and has one end connected to the phase modulator, and which guides each phase-modulated signal beam toward the direction of the optical waveguide from the different direction;
    an optical multiplexer which is provided at the second passive optical waveguide and multiplexes the plurality of phase-modulated signal beams into one signal beam; and
    a second optical amplifier which is provided on the semiconductor substrate such that one end of the second optical amplifier is connected to another end of the second passive optical waveguide and another end of the second optical amplifier contacts with the first end surface or the second end surface, and which amplifies the signal beam guided by the second passive optical waveguide, along the direction of the optical waveguide, and outputs the amplified signal beam to outside, an optical confinement factor of the second optical amplifier being greater than that of the first optical amplifier, wherein an optical waveguide length of the first optical amplifier and an optical waveguide length of the second optical amplifier are equal, and a first gain core layer of the first optical amplifier and a second gain core layer of the second optical amplifier are each formed by a multiple quantum well structure, and a total number of well layers in the multiple quantum well structure forming the second gain core layer is larger than a total number of well layers in the multiple quantum well structure forming the first gain core layer.

7. A semiconductor optical integrated element having a first end surface and a second end surface opposite to the first end surface, the semiconductor optical integrated element comprising:

a semiconductor substrate;

a first optical amplifier which is provided on the semiconductor substrate and has one end contacting with the first end surface, and which amplifies a signal beam inputted from the first end surface, along an optical waveguide;

a first passive optical waveguide which is provided on the semiconductor substrate and connected to another end of the first optical amplifier, and which guides the amplified signal beam toward a direction different from a direction of the optical waveguide;

an optical splitter which is provided at the first passive optical waveguide and splits the guided signal beam into a plurality of signal beams;

a phase modulator which is provided on the semiconductor substrate and connected to each of a plurality of the branched first passive optical waveguides, and which performs phase modulation on the plurality of signal beams along the different direction;

a second passive optical waveguide which is provided on the semiconductor substrate and has one end connected to the phase modulator, and which guides each phase-modulated signal beam toward the direction of the optical waveguide from the different direction;

an optical multiplexer which is provided at the second passive optical waveguide and multiplexes the plurality of phase-modulated signal beams into one signal beam; and a second optical amplifier which is provided on the semiconductor substrate such that one end of the second optical amplifier is connected to another end of the second passive optical waveguide and another end of the second optical amplifier contacts with the first end surface or the second end surface, and which amplifies the signal beam guided by the second passive optical waveguide, along the direction of the optical waveguide, and outputs the amplified signal beam to outside, an optical confinement factor of the second optical amplifier being greater than that of the first optical amplifier, wherein an optical waveguide length of the second optical amplifier is smaller than an optical waveguide length of the first optical amplifier, and a first gain core layer of the first optical amplifier and a second gain core layer of the second optical amplifier are each formed by a multiple quantum well structure, and a total number of well layers in the multiple quantum well structure forming the second gain core layer is larger than a total number of well layers in the multiple quantum well structure forming the first gain core layer.

* * * * *